Dec. 19, 1922.
V. RULLO.
BICYCLE.
ORIGINAL FILED NOV. 14, 1919.
1,439,263
5 SHEETS-SHEET 1
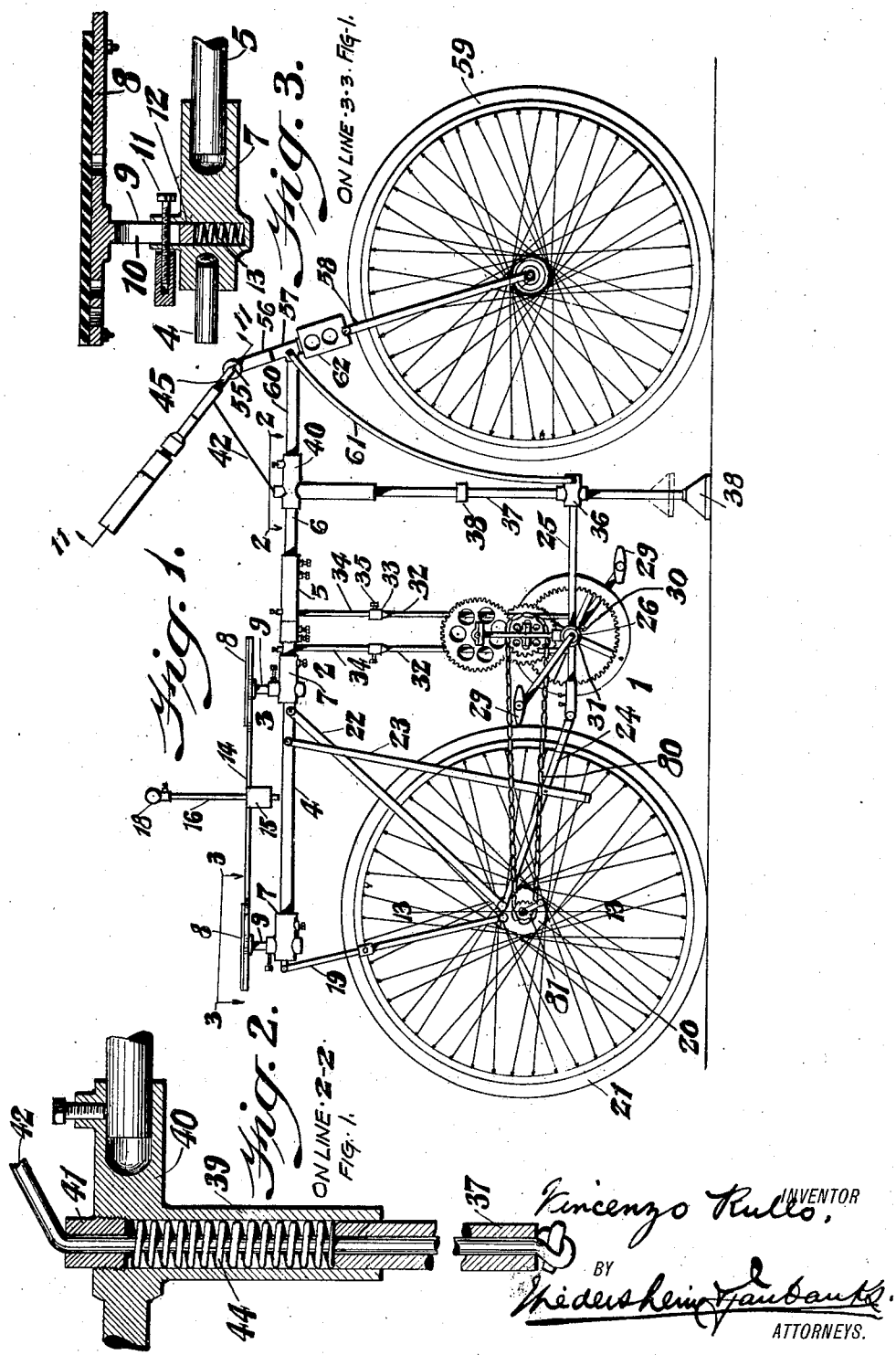
INVENTOR
Vincenzo Rullo,
BY
ATTORNEYS.

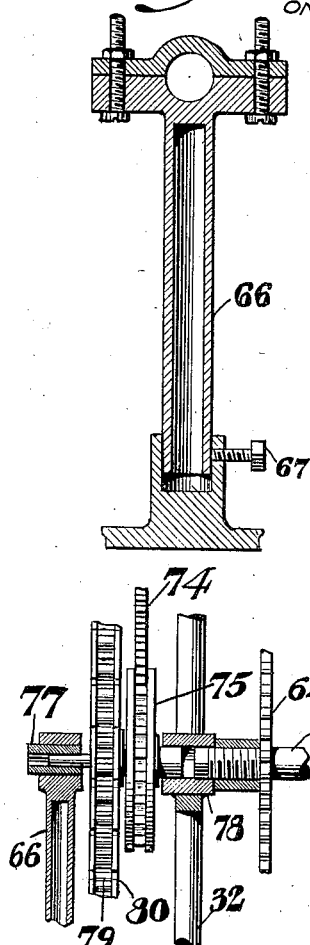
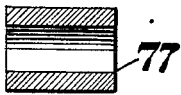
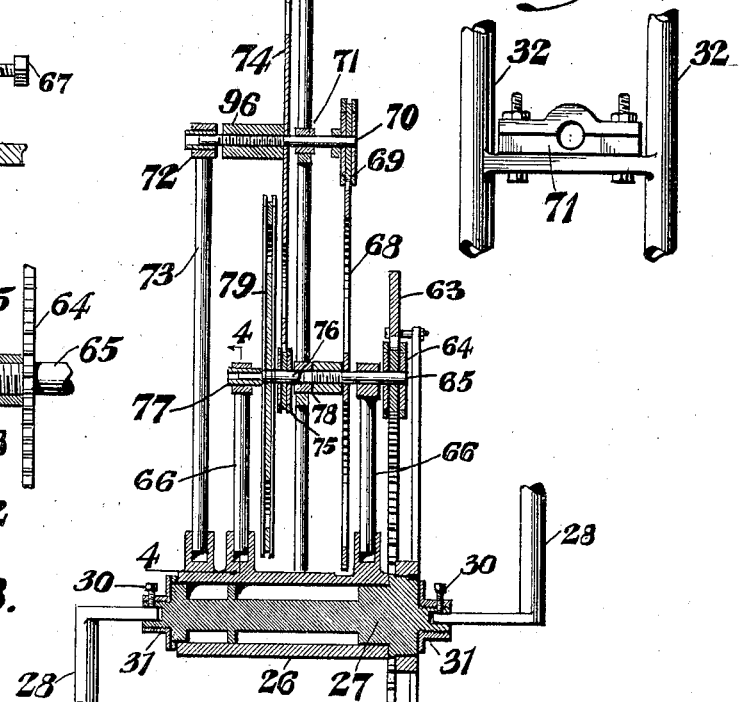

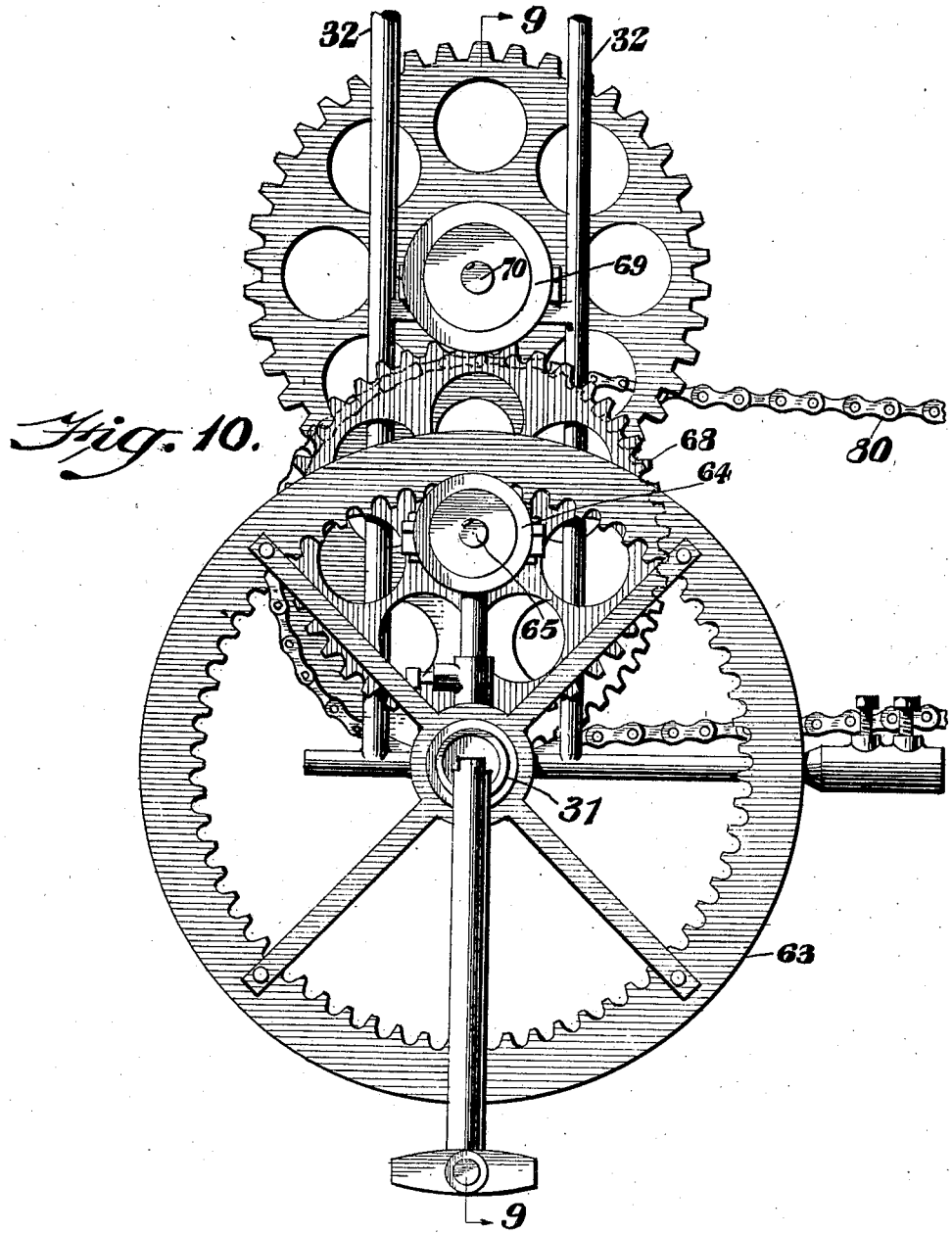

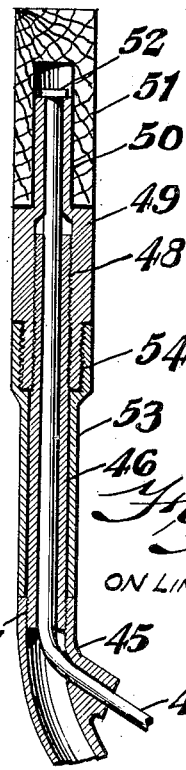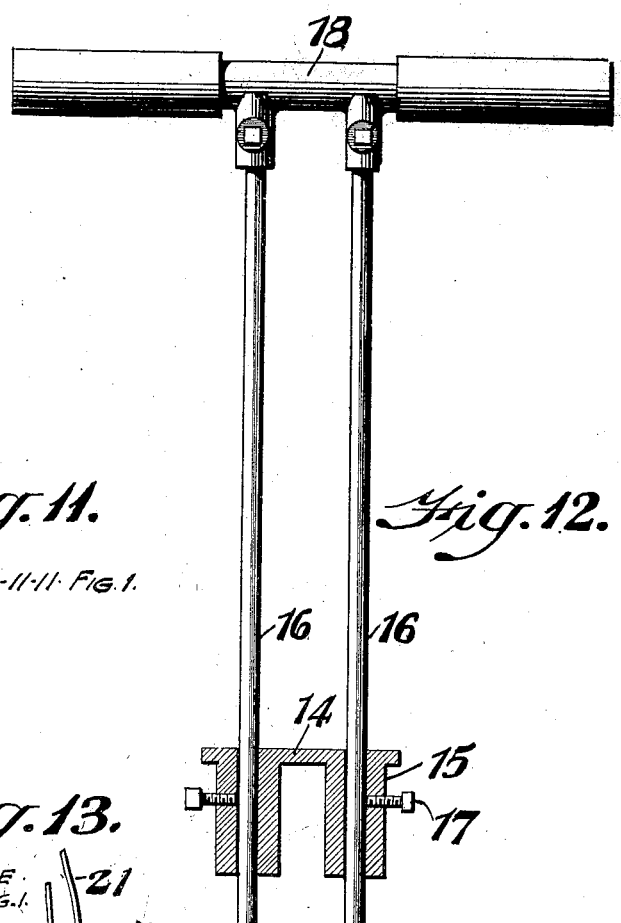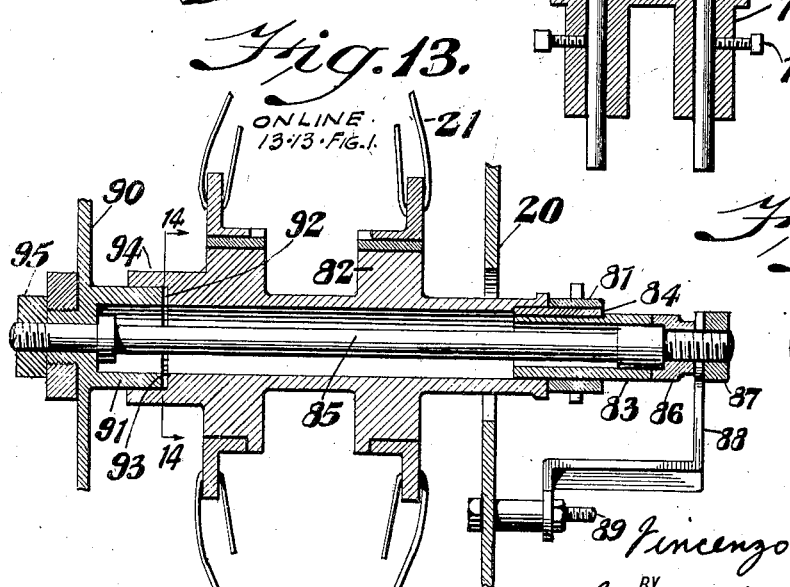

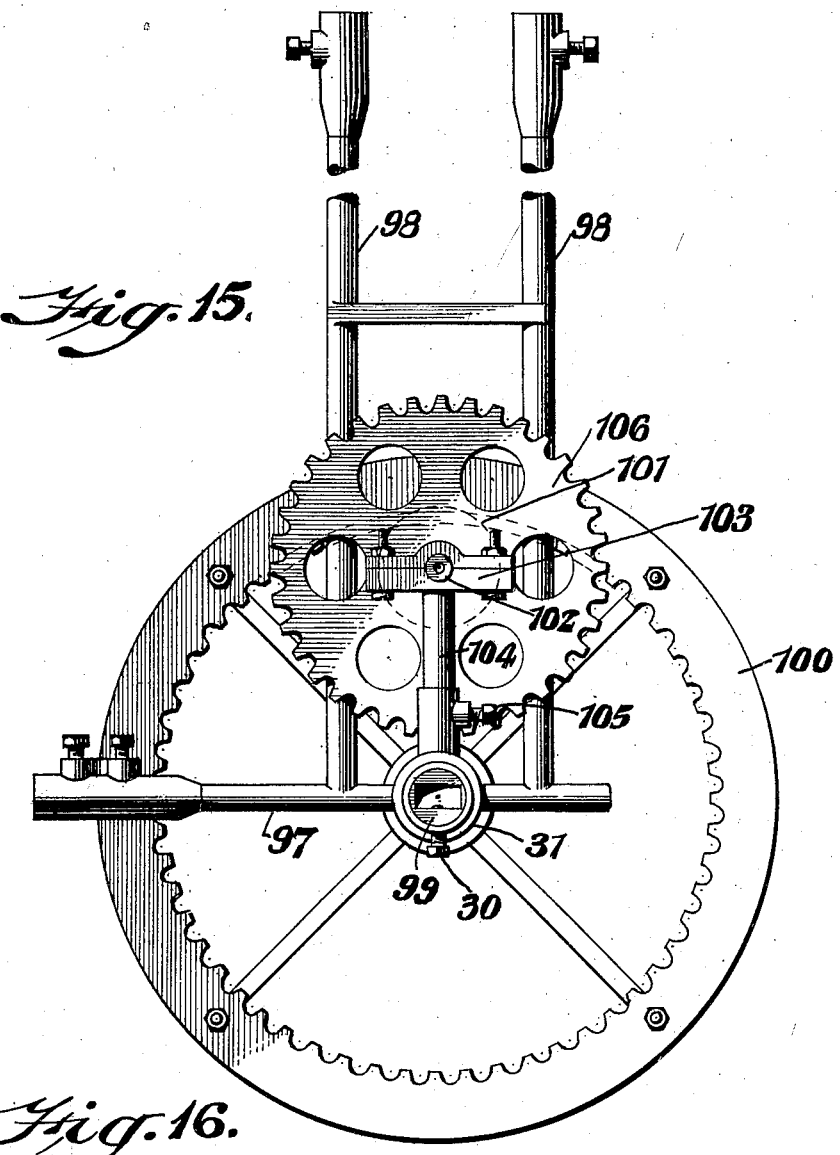

Patented Dec. 19, 1922.

1,439,263

UNITED STATES PATENT OFFICE.

VINCENZO RULLO, OF PHILADELPHIA, PENNSYLVANIA.

BICYCLE.

Application filed November 14, 1919, Serial No. 338,063. Renewed November 4, 1922. Serial No. 599,149.

*To all whom it may concern:*

Be it known that I, VINCENZO RULLO, a subject of the King of Italy, residing in the city and county of Philadelphia, State of Pennsylvania, have invented a new and useful Bicycle, of which the following is a specification.

My present invention consists of a novel construction of a bicycle which is constructed in such a manner that it can be operated at a very high speed without the necessity of employing any motive power except that of the rider.

It further consists of a novel construction of a bicycle frame and novel means for adjustably securing the parts together whereby all parts of the bicycle except the wheels can readily be taken apart and packed in an ordinary sized suit case.

It further consists of a novel construction and arrangement of driving mechanism.

It further consists of a novel construction and arrangement of a seat or seats and a novel manner of connecting the seat or seats with respect to the bicycle frame.

It further consists of a novel construction of an arrangement of change speed gears which can be readily substituted one for the other so that the bicycle can be driven at any desired speed ratio.

Other novel features of construction and advantage will hereinafter more clearly appear in the detailed description of the invention.

For the purpose of illustrating my invention, I have shown in the accompanying drawings a typical embodiment of it which in practice will give satisfactory and reliable results. It is, however, to be understood that this embodiment is typical only and that the various instrumentalities of which my invention consists can be variously arranged and organized and that my invention is not limited to the precise arrangement and organization of these instrumentalities as herein set forth.

Figure 1 represents in side elevation, a high speed bicycle, embodying my invention.

Figure 2 represents a section on line 2—2 of Figure 1.

Figure 3 represents a section on line 3—3 of Figure 1.

Figure 4 represents a section on line 4—4 of Figure 9.

Figure 5 represents in section an enlarged view of the sleeve seen in Figure 9.

Figure 6 represents, on an enlarged scale and in section, a journal bushing seen in Figure 9.

Figure 7 represents in side elevation a portion of the framework.

Figure 8 represents in front elevation and partly in section a portion of the driving mechanism.

Figure 9 represents a section on line 9—9 of Figure 10.

Figure 10 represents, in side elevation, a portion of the driving mechanism.

Figure 11 represents a section on line 11—11 of Figure 1.

Figure 12 represents, in front elevation, the auxiliary handle and the construction by which it is adjustably supported.

Figure 13 represents a section on line 13—13 of Figure 1.

Figure 14 represents a section on line 14—14 of Figure 13.

Figure 15 represents, in side elevation, another embodiment of driving mechanism which can be substituted for that seen in Figure 1.

Figure 16 represents, in side elevation, a portion of the driving mechanism seen in Figure 15.

Similar numerals of reference indicate corresponding parts.

Referring to the drawings.

1 designates a high speed bicycle embodying my invention. 2 designates the frame which is made in sections so that when desired it can be taken apart and packed in a small compass, for example, it can be readily placed in an ordinary sized suit case. The frame 2 is provided with a top bar 3 which includes the sections 4, 5 and 6. The section 4 has adjustably connected therewith the seat carrying brackets 7 which are slidably mounted on such section. 8 designates the seats each of which is provided with a post 9 which is slotted as indicated at 10, Figure 3, and through this slot extends a fastening device 11, such as for example a bolt, which passes through the bracket 7 and through its respective slot 10. The posts 9 are guided in recesses 12 in their respective brackets 7 and between the bottom of the posts and the bottom of the recess there is interposed a spring 13. The seats 8 are connected by a plate 14 which is provided with the bosses or enlargements 15 which are apertured to form guides to receive the rods 16 which are adjustably secured in such bosses 15 by means of set screws 17, see more particularly Figure 12. The rods 16 are secured in any desired manner to a handle bar 18 which forms the auxiliary or rear handle bar to be grasped by the occupant of the rear seat. The section 4 of the top bar has connected to it in any desired manner the sectional rear braces 19 which are also connected to the hub plates 20 and 90 of the rear wheel 21. The hub plates 20 and 90 and the section 4 of the top bar are also connected by the brace bars 22. Brace bars 23 are connected at their upper ends to the section 4 of the top bar and at their lower ends they are connected to the bottom brace bar 24, one end of which is connected to the hub 20 while the opposite ends of such bars are detachably connected to the bottom brace bar 25 which carry in any desired manner the bearing or housing 26 in which is mounted the shaft 27 to which is detachably connected the cranks 28, see Figure 9, and to these cranks 28 the pedals 29 are secured in any desired manner.

The cranks are secured in position by means of the cap screws 30 which pass through the caps 31 and retain the crank 27 in its assembled position. The bearing 26 has formed integral with it the upwardly extending spaced bars 32 which are provided at their upper ends with sockets 33 in which are secured the depending bars 34 by means of fastening devices 35, the bars 34 being adjustably connected to their respective section on the top bar of the frame.

The bottom brace bar 25 is detachably connected to a fitting 36 in which is slidable a rod 37 which carries at its lower end a foot piece 38 which can be brought into engagement with the ground in order to serve as a stand. The rod 37 is made in sections, the sections being connected by means of a coupling 38 and the upper section telescopes into the apertured sleeve 39 of the bracket 40, see Figure 2. The upper end of the aperture in the sleeve 39 and the bracket 40 is closed by means of an apertured plug 41 in order to provide for the passing therethrough of a cable 42 which passes through the upper section of the brake rod 37 and is connected therewith in any desired manner for example as shown in Figure 2. A spring 44 is interposed between the plug 41 and the upper section of the brake rod 37. The cable 42, see more particularly Figure 11, passes into the handle bar 45 and through a tubular sleeve 46 which is in threaded engagement with a fixed portion of the bar as at 47. At its opposite end the sleeve 46 is exteriorly threaded as indicated at 48. The cable 42 passes through a rotatable handle section 49 which is provided with a reduced portion 50 which extends into the grasping portion 51 of one arm of the handle bar. The cable 42 is provided with a head 52 which abuts against the end of the rotatable handle section 49 which latter is in threaded engagement with the threads 48 on the stationary sleeve 46.

The sleeve 46 has fixed to it in any desired manner an outer sleeve 53 which is in threaded engagement with the rotatable handle portion 49 at 54. It will be understood from this that when the handle 49 is rotated in the proper direction the cable 42 will cause the rod 37 to be raised so that the member 38 will be moved into such position that it will not contact with the ground.

The handle 45 is swivelled at 55, see Figure 1, to the post 56, the post 56 being swivelled in a bracket or fitting 57 and being connected to the front fork 58 in which the front wheel 59 is journalled in the usual manner. The bracket or fitting 57 is provided with the rearwardly extending rod 60 which is adjustably connected to the bracket 40. A brace bar 61 is also preferably provided one end of which is connected to the bracket 57 while its opposite end is connected to the fitting 36. The fork 58 is provided with an apertured casing 62 the front face of which is open thereby adapting it to receive any desired type of head light.

The shaft 27, see more particularly Figures 9 and 10, has fixedly connected with it an internal gear 63 which meshes with a pinion 64 mounted on a shaft 65 journalled in the standards 32 and 66 which latter are secured in any desired manner with respect to the bearing 26, as illustrated by means of set screws 67.

The shaft 65 has fixed to it a gear 68 which meshes with a pinion 69 mounted on a shaft 70 journalled in a bearing 71 connected to the bars 32 and in a bearing 72 at the upper end of a rod 73, the lower end of which latter is secured to the bearing 26. The shaft 70 has fixed thereto a gear 74 which meshes with a pinion 75 fixed to a shaft 76 which is rotatably mounted in a journal 77 carried by one of the standards 66 and in a bearing 78 connected with one of the bars 32. The shaft 76 has also fixed to it a sprocket wheel 79 around which passes the sprocket chain 80 which also passes around a sprocket wheel 81 which is keyed to the hub 82 of the rear wheel and to a sleeve 83 by means of a key 84 so that the rear wheel rotates in unison with the sprocket wheel 81. The sleeve 83 is mounted on the rear shaft 85 which is provided with a nut 86 and a nut 87 between which is located the bracket 88 which is connected by means of a fastening device 89 to the hub plate 20.

The shaft 85 is journalled in the hub plate 90 which is provided with an inwardly extending annular sleeve 91, the inner face of which is serrated as indicated at 92 or provided with teeth which co-operate with serrations or teeth 93 on the juxtaposed end of the hub 82 of the rear wheel, the hub 82 being provided with a laterally extending sleeve 94 into which the sleeve 91 telescopes and in which it has a bearing. The shaft 85 is provided with a nut 95 which co-operates with the nut 87 to retain the parts in their assembled position. The hub 82 may be mounted in any desired manner and as shown the sleeve 91 and the hub are provided respectively with the cooperating teeth 92 and 93 which preferably have a clearance between them. The shaft 70, see Figures 5 and 9, has in engagement with it a threaded sleeve 96 which engages with the gear 74 which is keyed to the shaft 70.

The arrangement of the driving gears is such that a gear unit may be readily disconnected from the frame and another gear unit secured in position which has a different gear ratio or a different number of gears so that any desired range of speed may be provided by simply substituting one gear unit for another.

As it is impracticable to illustrate all of the different speed ratios which might be employed, I have deemed it necessary to illustrate but one of these gear units which can be substituted for that shown in Figure 9. This embodiment is seen in Figures 15 and 16 and as seen in Figure 15, I provide the bottom shaft 97 the equivalent of the shaft 25 in Figure 1, said bottom bar 97 being connected with the bars 98 which form the equivalent of the bars 32 and adapted to be connected to the bars 34. The shaft 99 has fixed to it the internal gear 100 which meshes with a pinion 101 mounted on a shaft 102 which is mounted in the journal bearing 103 carried by the rods 104 which are adjustably connected to a fixed portion of the frame by fastening devices 105. The shaft 102 has also fixed to it the sprocket wheel 106 around which the sprocket chain 80 passes when the gear unit shown in Figure 15 is substituted for that seen in Figure 1.

The operation will now be readily understood and is as follows:—

The construction and arrangement of the gearing in Figure 1 is such that the rider may obtain a very high rate of speed without the necessity of employing any motor and it is my purpose to provide nineteen changes of speed so that by substituting one gear unit for another any desired range of speed can be obtained without employing any motive power except that of the rider. The hand operated prop 38 is controlled by means of the rotatable handle portion 49 it being best understood from Figure 11 that when this handle is rotated the braking member 38 can be raised or lowered and the spring 44 will cause the braking member 38 to be moved downwardly when the cable 42 is permitted to move downwardly due to the rotation of the grasping handle 49. If the operator holds the pedals 29 stationary or back pedals to a slight degree the teeth 93 will ride over the teeth 92 in such a manner as to create a friction between them and a braking action will be exerted on the rear wheel. When the rider is pressing down on the pedals with his feet so as to cause the forward movement of the bicycle the teeth 93 will move out of the path of the teeth 92 and there will be no engagement between such teeth.

It will be apparent that in accordance with my present invention, the sections of the bicycle frame may be readily disconnected so that the frame, the seat, the handle bars and fork can be packed in a suit case for the purpose of transportation, so that all parts of the machine can be transported in a knock-down condition with the exception of the wheels.

Whenever it is desired to employ a driving mechanism which will operate at a higher or a lower speed all that it is necessary to do is to detach the gear unit from the frame and assemble with the frame a gear unit in which the driving gears have the desired relative ratio.

It will now be apparent that I have devised a novel and useful construction of a bicycle which embodies the features of advantage enumerated as desirable in the statement of the invention and the above description, and while I have, in the present instance shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In a bicycle, a gear unit comprising a frame adapted to be detachably connected to and form the main part of the frame of the bicycle, said gear frame having a hub rotatably mounted therein, an internal gear connected with said hub, pedals operatively connected with said hub, a pinion driven by said gear, a rotatable shaft to which said pinion is fixed, a gear fixed to said shaft, a second pinion driven by said second gear, a third gear driven by said second pinion, a third pinion driven by said third gear, a sprocket wheel driven by said third pinion, and a sprocket chain actuated by said sprocket wheel and adapted to drive the bicycle.

2. In a bicycle, a gear unit adapted to be connected to and removed from the bicycle as a unit and comprising a frame, a shaft mounted therein, pedals operatively connected to said shaft, an internal gear connected with said shaft, a pinion driven by said internal gear, a second gear driven by said pinion, a sprocket wheel operatively connected by said second pinion, and a sprocket chain driven by said sprocket wheel.

3. In a bicycle, a gear unit comprising a frame forming a detachable portion of the bicycle frame, a shaft pivotally mounted in said frame, pedals operatively connected to said shaft, an internal gear fixed to said shaft, a pinion driven by said gear, a shaft on which said pinion is fixed, a gear driven by said second shaft, a third shaft mounted in said frame, a pinion thereon driven by said second gear, a gear fixed to said third shaft, a fourth shaft mounted in said frame, a pinion thereon driven by said third gear, a sprocket wheel fixed to said fourth shaft, a driving wheel mounted in said frame, and means for operatively connecting said driving wheel with said sprocket wheel.

4. In a bicycle, a frame for a gear unit, comprising a bearing, spaced bars extending therefrom, a driving shaft mounted in said bearing, an internal gear fixed to said driving shaft, standards carried by said bearing, shafts journalled in said standards and in said bars, a gear transmission mounted on said shaft and driven by said internal gear, and a sprocket gear driven by said gear transmission.

VINCENZO RULLO.

Witnesses:
 H. S. FAIRBANKS,
 C. D. McVAY.